United States Patent
Lin et al.

[11] Patent Number: 6,107,717
[45] Date of Patent: Aug. 22, 2000

[54] MOTOR STRUCTURE HAVING BEARING PRELOAD ASSEMBLY

[75] Inventors: Kuo-Cheng Lin; Yu-Hung Huang; Wen-Shi Huang, all of Taoyan, Taiwan

[73] Assignee: Delta Electronics, Inc., Taoyan Shien, Taiwan

[21] Appl. No.: 09/326,659

[22] Filed: Jun. 7, 1999

[51] Int. Cl.$^7$ ........................................ H02K 7/08
[52] U.S. Cl. ........................ 310/90; 310/67 R; 310/91
[58] Field of Search ...................... 310/90–91, 67 R, 310/40 MM, 51, 42, 62, 63; 384/517, 204, 420, 220, 236, 559, 561, 563, 581, 582; 360/97.01, 97.02

[56] References Cited

U.S. PATENT DOCUMENTS

| | | | |
|---|---|---|---|
| 3,804,562 | 4/1974 | Hansson | 418/107 |
| 4,019,824 | 4/1977 | Percy | 403/261 |
| 4,083,613 | 4/1978 | McGee | 384/585 |
| 4,484,492 | 11/1984 | Cadic | 74/625 |
| 4,658,312 | 4/1987 | Elsasser et al. | 360/99.08 |
| 5,128,574 | 7/1992 | Koizumi et al. | 310/90 |
| 5,316,393 | 5/1994 | Daugherty | 384/517 |
| 5,343,104 | 8/1994 | Takahashi et al. | 310/90 |
| 5,663,604 | 9/1997 | Takahashi | 310/91 |
| 5,687,016 | 11/1997 | Seto | 359/200 |
| 5,959,383 | 9/1999 | Winzen et al. | 310/90.5 |

*Primary Examiner*—Nestor Ramirez
*Assistant Examiner*—Tran Nguyen

[57] ABSTRACT

A motor structure comprises a shaft formed with a circumferential groove; a hub fixed on the shaft and formed with a projected portion at the inner lower end of the central part thereof; at least two bearings for supporting the shaft for rotation; a bearing seat formed with at least one projected portion and for holding the at least two bearings, the projected portion being provided between the two bearings; and an elastic ring engaged with the circumferential groove and in cooperation with the projected portion of the bearing seat and the projected portion of the hub for fixing the bearing.

10 Claims, 4 Drawing Sheets

MOTOR STRUCTURE HAVING BEARING PRELOAD ASSEMBLY

FIELD OF THE INVENTION

The present invention relates generally to a motor structure, and more particularly, to a motor structure with a compact bearing-preloading and vibration-absorbing structure.

BACKGROUND OF THE INVENTION

A motor is an important part in a fan. As systems to be cooled are becoming thinner and thinner, the thickness of a fan for use in this such of systems has to be reduced. Consequently, the thickness of the fan motor has to be reduce as well.

The bearing in a motor structure is an important part thereof. It can be understood to those skilled in the art that the bearing has to be pre-loaded so that it can operate in a good condition. There are some ways for pre-loading a bearing. For example, in U.S. Pat. No. 5,343,104, the bearing is pre-loaded by means of a projected portion of a bearing race and a thrust plate. A stopper is attached onto an end portion of a motor shaft against the thrust plate by means of press fitting. It is hard to make the fan disclosed in the '104 patent thinner because its fan motor includes many elements.

The structure of a conventional fan motor is now described here for explaining another way of pre-loading the bearing in the following. The structure as shown in FIG. 1 includes a housing 101, with a bearing seat 102 having a projected portion 102a located in the central portion of the housing. A bearing 103 and a bearing 104 are respectively inserted from above and from below into the bearing seat 102 and separated by the projected portion 102a. A shaft 105 is formed with a circumferential groove 105a and an impeller 108 is fixed on the shaft 105 for rotation therewith. Impeller 108 has a hub 108a and a plurality of blades 108b. A coil assembly 106 includes a silicon steel set 106a, an insulation portion 106b, a coil 106c, and a snap engaging portion 106d. A printed circuit board 107 is fixed on the housing 101 in a engagement with the snap engaging portion 106d; a spring 109, and a C-ring 110.

As shown in FIG. 1, the spring 109 is provided at the upper end of the bearing 104 and the C-ring 110 is provided at the lower end of the bearing 103 for pre-loading the bearings 103 and 104. The two ends of the spring 109 contact the bearing 104 and the hub 108a, respectively. The spring 109 and the projected portion 102a cooperatively pre-load the bearing 104. On the other hand, the C-ring 110 is engaged with the circumferential groove 105a. The elastic force provided by the spring 109 and the cooperation between the C-ring 110 and the projected portion 102a can fix and pre-load the bearing 103.

FIG. 2 is the free body diagram of the bearings 103 and 104 shown in FIG. 1. Referring to FIGS. 1 and 2, forces F1 and F2 are provided by the spring 109. Forces F3, F4, F5, and F6 are provided by the projected portion 102a. Forces F7 and F8 are provided by the C-ring 110. It can be understood that forces F1 to F4 pre-load the bearing 104 and forces F5 to F8 pre-load the bearing 103.

The drawbacks of the above conventional fan motor structure will be described in the following. As shown in FIG. 1, the bearing seat 102 is fixed in the housing 101 and the coil assembly 106 can be fixed to the outer surface of the bearing seat 102 by glue. The bearing seat 102, spring 109, and C-ring 110 cooperatively pre-load and fix the bearings 103 and 104. However, the vibrations generated when the motor operates is not absorbed if there is a tolerance between the bearing seat 102 and any of the bearings 103 and 104 because the bearing seat 102 and the bearings 103 and 104 are substantially rigid.

Moreover, the spring 109 and the C-ring 110 are primarily for pre-loading and fixing the bearings 103 and 104. If a single member can provide the same functions, then the manufacturing and assembling processes can be simplified and it becomes possible to provide a thinner motor.

SUMMARY OF THE INVENTION

It is therefore an object of the present invention to provide a motor structure which provide the functions of pre-loading and fixing the bearing(s) therein by means of fewer elements, a better vibration-absorbing effect, and can be used to produce a thin fan.

The first embodiment of the fan motor structure in accordance with the invention comprises: a shaft formed with a circumferential groove; a hub fixed on the shaft and formed with a projected portion at the inner lower end of the central part thereof; a bearing for supporting the shaft for rotation; a bearing seat formed with a projected portion and for holding the bearing; and an elastic ring engaged with the circumferential groove and in cooperation with the projected portion of the bearing seat and the projected portion of the hub for fixing the bearing.

The second embodiment of the fan motor structure in accordance with the invention comprises: a shaft formed with a circumferential groove; a hub fixed on the shaft and formed with a projected portion at the inner lower end of the central part thereof; at least two bearings for supporting the shaft for rotation; a bearing seat formed with at least one projected portion and for holding the at least two bearings, the projected portion being provided between the two bearings; and an elastic ring engaged with the circumferential groove and in cooperation with the projected portion of the bearing seat and the projected portion of the hub for fixing the bearing.

BRIEF DESCRIPTION OF THE DRAWINGS

The above and other objects and the features and effects of the present invention can be best understood by referring to the following detailed description of the preferred embodiments and the accompanying drawings, wherein.

DETAILED DESCRIPTION OF THE PREFERRED EMBODIMENTS

Figure 3:
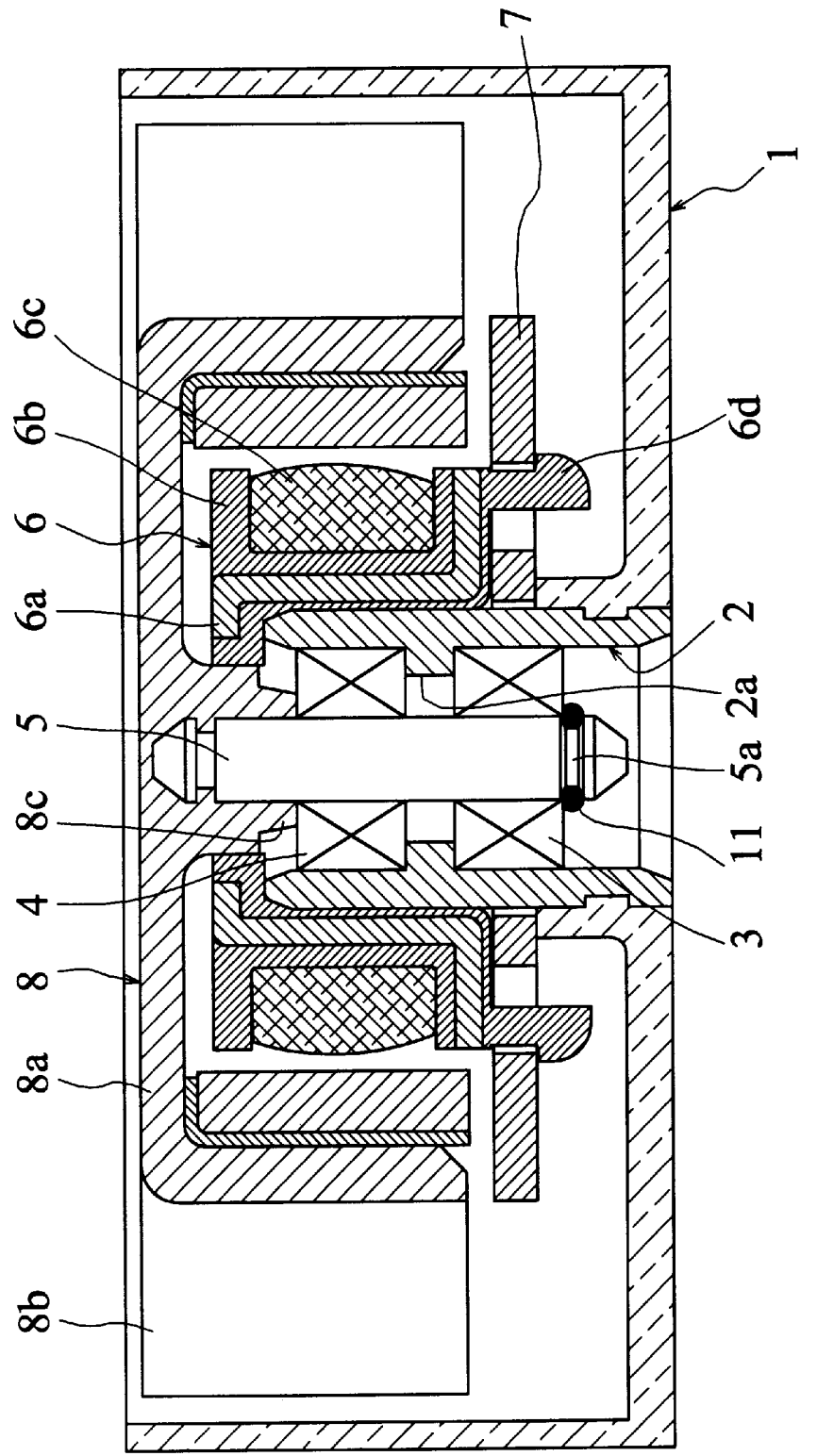
FIG. 3 is a sectional view of the first embodiment of the fan motor structure in accordance with the invention.

Referring now to FIG. 3, the first embodiment of the fan motor structure in accordance with the invention comprises: a housing 1; a bearing seat 2 located in the central portion of the housing and having a projected portion 2a; a bearing 3 and a bearing 4 inserted from above and from below respectively into the bearing seat 2 and separated by the projected portion 2a; a shaft 5 formed with a circumferential groove 5a; an impeller 8 fixed on the shaft 5 for rotation therewith and having a hub 8a, a plurality of blades 8b, and a projected portion 8c; a coil assembly 6 including a silicon steel set 6a, an insulation portion 6b, a coil 6c, and a snap engaging portion 6d; a printed circuit board 7 fixed on the housing 1 in snap engagement with the snap engaging portion 6d; and an O-ring 11 engaged with the circumferential groove 5a.

Figure 1:
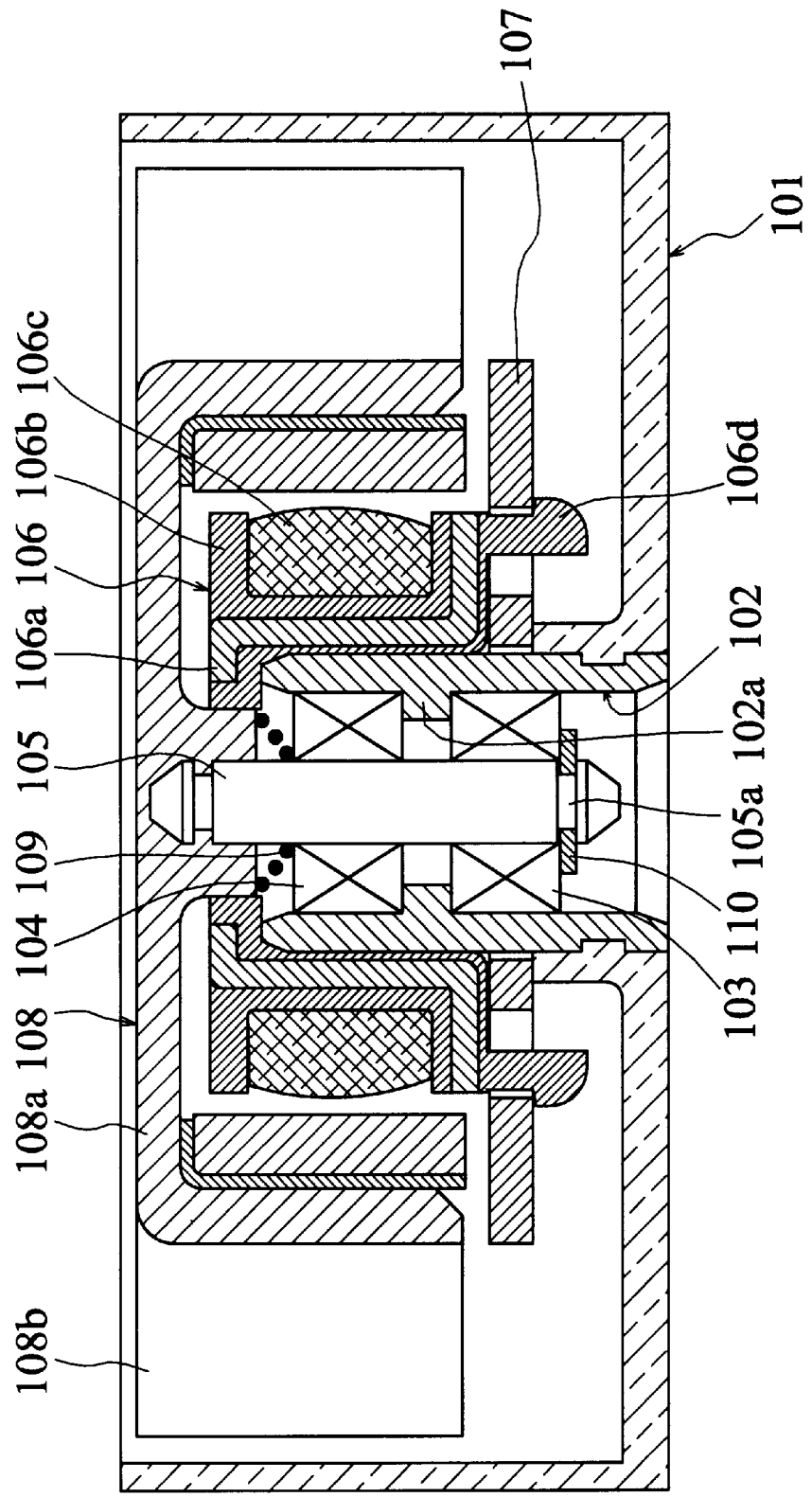
FIG. 1 is a sectional view of a conventional fan motor structure.
Figure 2:
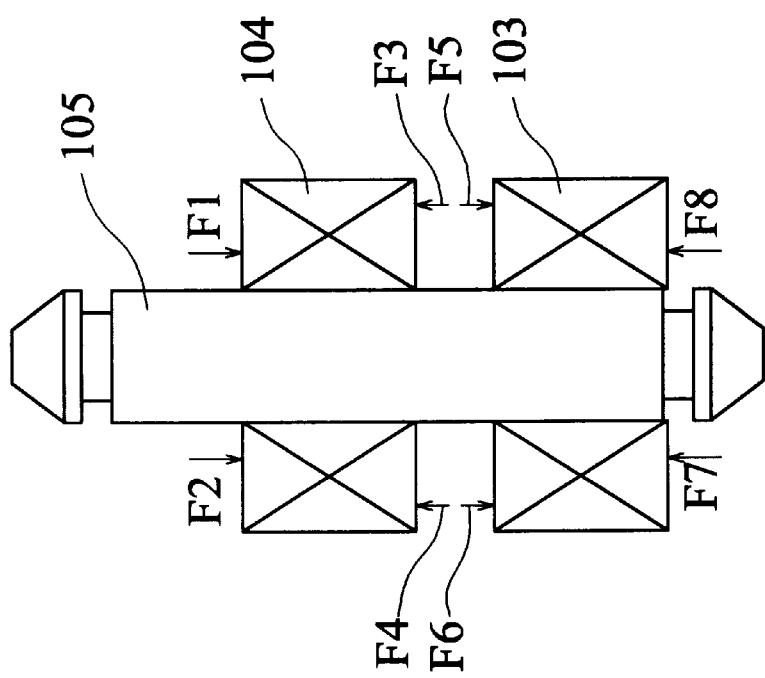
FIG. 2 is a free body diagram showing the forces exerted on the bearings shown in FIG. 1.

Comparing FIG. 3 with FIG. 1, it can be seen that the first embodiment of the fan motor structure is characterized in that the O-ring 11 is used to replace the spring 109 and the C-ring 110 shown in FIG. 1. The O-ring 11 is engaged with the circumferential groove 5a and contacts the bearing 3. The elasticity of the O-ring 11 provides an upward pushing force against the bearing 3. Moreover, the projected portion 8c provided at the inner lower end of the central part of the hub 8a exerts a downward pushing force against the bearing 4. Thereby, the cooperation between the projected portion 8c, the projected portion 2a, and the O-ring 11 pre-loads the bearings 3 and 4. The pre-loading forces on the bearings 3 and 4 are similar to those shown in FIG. 2 and are not described here.

From the above, it can be seen that the O-ring 11 integrates the functions of the spring 109 and C-ring 110 of a conventional fan motor and therefore can reduce the number of elements in a conventional fan motor. This makes it possible to produce a thin fan motor.

Figure 4:
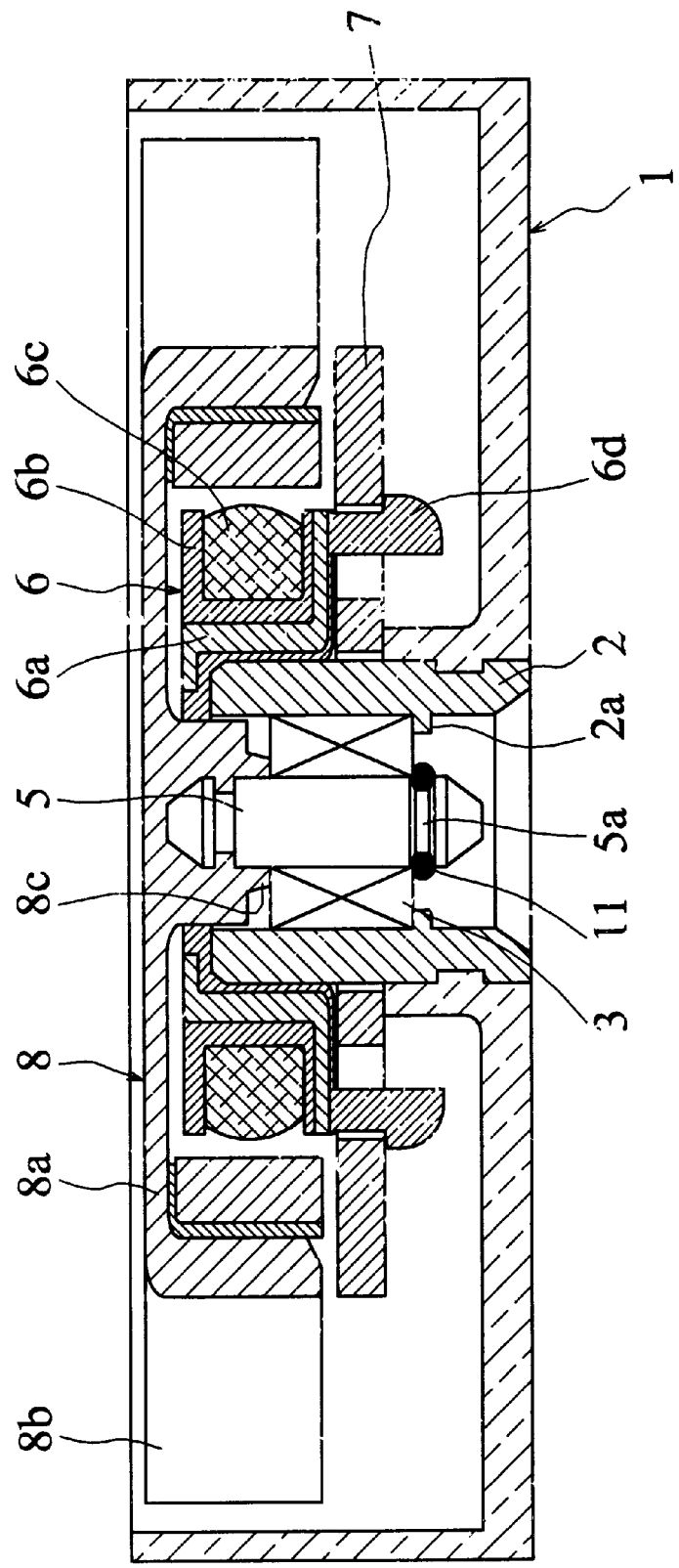
FIG. 4 is a sectional view of the second embodiment of the fan motor structure in accordance with the invention.

Referring now to FIG. 4, the second embodiment of the fan motor structure in accordance with the invention comprises: a housing 1; a bearing seat 2 located in the central portion of the housing and having a projected portion 2a; a bearing 3 inserted from above into the bearing seat 2; a shaft 5 formed with a circumferential groove 5a; an impeller 8 fixed on the shaft 5 for rotation therewith and having a hub 8a, a plurality of blades 8b, and a projected portion 8c; a coil assembly 6 including a silicon steel set 6a, an insulation portion 6b, a coil 6c, and a snap engaging portion 6d; a printed circuit board 7 fixed on the housing 1 and in snap engagement with the snap engaging portion 6d; and an O-ring 11 engaged with the circumferential groove 5a and contacts with the bearing 3.

Comparing FIG. 4 with FIG. 3, it can be seen that, in the second embodiment of the fan motor structure, the single bearing 3 is used to support the shaft 5 for rotation. The cooperation between the projected portion 8c and the projected portion 2a provides a pre-load against the bearing 3. The bearing 3 cannot be fixed when the projected portion 8c and the projected portion 2a do not contact the bearing simultaneously because the projected portion 2a and the bearings 3 are substantially rigid. In this case, an O-ring 11 can be used to assist the projected portion 2a to fix the bearing 3 and to absorb the vibrations of the motor. Therefore, the manufacturing tolerances of the bearing 3, the bearing seat 2, and the hub 8a need not to be very strict. This means the manufacturing cost can be reduced.

To sum up, the O-ring 11 in the two fore mentioned embodiments provide a pre-load to the related bearing(s) and can absorb motor vibrations. When there is a clearance between the bearing(s) and the bearing seat, the motor structure generates vibrations. In this case, the O-ring is very helpful in absorbing vibrations of the motor structure.

Although two preferred embodiments of the invention have been illustrated and described, it will be obvious to those skilled in the art that various modifications may be made without departing from the scope and spirit of the invention defined by the appended claims. For example, three or more bearings instead of two bearings, as in the first embodiment, can be used. Besides, although the projection portion of the hub according to the second embodiment is formed at the inner portion thereof, the projection portion can be formed at the outer portion of the hub or at both the inner and outer portions of the hub. Moreover, an elastic ring e.g. a helical spring can be used to replace the O-ring described above for preloading the bearing(s) and absorbing motor vibrations as long as it can provide radial shrink force and axis force simultaneously. In addition, the use of the motor structure in accordance with the invention is not limited to fan motors and can be used in other kinds of motors.

What is claimed is:

1. A motor structure comprising:

a shaft formed with a circumferential groove;

a hub fixed on said shaft and formed with a projected portion at an inner lower end of a central part thereof;

a bearing for supporting said shaft for rotation;

a bearing seat formed with a projected portion for contacting and holding said bearing; and an elastic ring engaged with said circumferential groove and in cooperation with said projected portion of said bearing seat and said projected portion of said hub for fixing said bearing wherein said shaft is biased axially with respect to said bearing seat by said elastic ring, and said bearing is preloaded by contacting with said projected portion of said hub and contacting with said projected portion of said bearing seat.

2. The motor structure according to claim 1, wherein said elastic ring is an O-ring.

3. The motor structure according to claim 1, wherein said elastic ring is a helical spring.

4. The motor structure of claim 1, wherein only one elastic ring axially biases said shaft.

5. The motor structure of claim 1, wherein said elastic ring provides both axial and radial biasing force.

6. A motor structure comprising:

a shaft formed with a circumferential groove;

a hub fixed on said shaft and formed with a projected portion at an inner lower end of a central part thereof;

at least two bearings for supporting said shaft for rotation;

a bearing seat formed with at least one projected portion for contacting and holding said at least two bearings, said at least one projected portion being provided between said at least two bearings; and an elastic ring engaged with said circumferential groove and in cooperation with said projected portion of said bearing seat and said projected portion of said hub for fixing said bearing, wherein said shaft is biased axially with respect to said bearing seat by said elastic rings one of said at least two bearings is preloaded by contacting with said projected portion of said hub and contacting with said at least one projected portion of said bearing seat, and the other one of said at least two bearings is preloaded by contacting with said at least one projected portion of said bearing seat and contacting with said elastic ring.

7. The motor structure according to claim 6, wherein said elastic ring is an O-ring.

8. The motor structure according to claim 6, wherein said elastic ring is a helical spring.

9. The motor structure of claim 6, wherein only one elastic ring axially biases said shaft.

10. The motor structure of claim 6, wherein said elastic ring provides both axial and radial biasing force.

* * * * *